(12) United States Patent
Schieltz et al.

(10) Patent No.: US 10,708,509 B2
(45) Date of Patent: Jul. 7, 2020

(54) SYSTEMS AND METHODS OF REMOTE PAN TILT SEALED SPHEROID CAMERAS MAINTAINING LEVEL IMAGE WHEN WALL OR CEILING MOUNTED

(71) Applicant: Sensormatic Electronics, LLC, Boca Raton, FL (US)

(72) Inventors: Steven W. Schieltz, Boca Raton, FL (US); Patrick Siu, Tyngsborough, MA (US)

(73) Assignee: Sensomatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/188,463

(22) Filed: Nov. 13, 2018

(65) Prior Publication Data
US 2020/0154055 A1    May 14, 2020

(51) Int. Cl.
*H04N 5/232* (2006.01)
*G03B 17/56* (2006.01)

(52) U.S. Cl.
CPC ....... *H04N 5/23299* (2018.08); *G03B 17/561* (2013.01); *H04N 5/23203* (2013.01)

(58) Field of Classification Search
CPC .................................................. H04N 5/23299
USPC ...................................................... 348/211.2
See application file for complete search history.

(56) References Cited

U.S. PATENT DOCUMENTS

| 9,264,619 B2 * | 2/2016 | Takizawa ........... H04N 5/23287 |
| 2006/0098092 A1 * | 5/2006 | Park ...................... H04N 7/183 |
| | | 348/143 |

* cited by examiner

*Primary Examiner* — Joel W Fosselman
(74) *Attorney, Agent, or Firm* — Foley & Lardner LLP (57) ABSTRACT

A camera system includes a camera, a drive system, and a processing circuit. The camera includes a lens and a sensor module that receives light and outputs images based on the received light. The drive system includes a track including a first member and a second member, the first member defining a first rail on an inner surface of the first member, the second member defining a second rail on an outer surface of the second member. The rails can be driven by gear or magnetic drive, and are connected in a cross pattern at a 45 degree latitude point, enabling pan and tilt movement to maintain a level image for multiple camera mounting orientations.

18 Claims, 7 Drawing Sheets

SYSTEMS AND METHODS OF REMOTE PAN TILT SEALED SPHEROID CAMERAS MAINTAINING LEVEL IMAGE WHEN WALL OR CEILING MOUNTED

BACKGROUND

Cameras, such as mini-dome cameras typically used for security, have a 3-axis gimbal which allows the lens and image module of the camera to pan (e.g., swivel the camera horizontally from a fixed position), tilt direction (e.g., the camera stays in a fixed position but rotates up/down in a vertical plane), and rotate so that the image can be level with the ground when wall mounted.

SUMMARY

One implementation of the present disclosure is a camera system. The camera system includes a camera, a drive system, and a processing circuit. The camera includes a lens and a sensor module that receives light via the lens and outputs one or more images based on the received light. The drive system includes a track including a first member and a second member, the first member defining a first rail on an inner surface of the first member, the second member defining a second rail on an outer surface of the second member, a first gear coupled to the first rail and the camera, a second gear coupled to the second rail and to a camera support, and at least one gear drive module that drives the first gear to a first position along the first rail responsive to a first control signal and the second gear to a second position along the second rail responsive to a second control signal. The processing circuit generates the first control signal and the second control signal based on at least one of a user input and a predetermined instruction.

Another implementation of the present disclosure is a camera system. The camera system includes a camera, a housing, a plurality of first electromagnets, a camera support, and a processing circuit. The camera includes a lens and a sensor module that receives light via the lens and outputs one or more images based on the received light. The housing defines a first magnetic track and a second magnetic track, the first magnetic track extending along a first surface of the housing shaped to receive the camera, the second magnetic track extending along a second surface of the housing opposite the first surface, the first magnetic track including a plurality of first magnetic strips of alternating polarity, the second magnetic track including a plurality of second magnetic strips of alternating polarity. The plurality of first electromagnets are disposed at least one of within and on a surface the camera. The camera support includes a plurality of second electromagnets. The processing circuit causes the plurality of first electromagnets to output a first magnetic field to drive the first magnetic track to a first position and causes the plurality of second electromagnets to output a second magnetic field to drive the second magnetic track to a second position, the processing circuit energizes the plurality of first electromagnets and the plurality of second based on at least one of a user input and a predetermined instruction.

Another implementation of the present disclosure is a method. The method includes identifying, by a processing circuit, an instruction to adjust an orientation of a camera about a pan axis and a tilt axis; generating, by the processing circuit, a first control signal to cause a drive system to drive the camera to a first pan angle based on the identified instruction; generating, by the processing circuit, a second control signal to cause the drive system to drive the camera to a first tilt angle based on the identified instruction; and transmitting, by the processing circuit, the first control signal to the drive system and the second control signal to the drive system.

This summary is illustrative only and is not intended to be in any way limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates generally to the field of camera systems, and more particularly to systems and methods of remote pan tilt sealed spheroid cameras maintaining level image when wall or ceiling mounted. Systems and methods in accordance with the present disclosure can provide a camera system that can maintain a level image when mounted to either a ceiling or wall, while using two axis—pan and tilt—functionality. As such, systems and methods in accordance with the present disclosure can reduce mechanical and electronic complexity as compared to security systems that may require motors or other adjustment mechanisms dedicated to moving in each of the pan (e.g., swivel the security camera horizontally from a fixed position), tilt (e.g., rotates up/down in a vertical plane), and rotate (e.g., so that the image can be leveled). Though not typically an issue with ceiling or pendant mounting of the security camera as pan movement rotates the security camera about the centroid and tilt movement adjusts the angle from the ceiling, a wall mounted security camera typically needs the rotation movement in order for the camera image to be level with the ground (since the panning or tilting may result in an image that is not level). The present solution can enable a camera to be sealed and covered without a bubble covering, avoiding image distortion and loss of resolution that can result from bubble coverings. By implementing external movement systems, the camera may be more effectively sealed, such as to prevent contaminant ingress, while enabling a user to remotely pan and tilt the camera; as such, installation and follow on maintenance can be simplified.

Existing video camera systems typically include fixed systems and pan-tilt-zoom (PTZ) systems. Fixed cameras may be manually adjusted at the installation for position pointing (by changing pan, tilt and imager rotational position), and image field of view (by physically changing lenses, or adjusting varifocal or zoom lenses). Fixed cameras can have motorized varifocal and motorized focus allowing adjusted at the recording client workstation. PTZ systems can have motors to adjust pan, tilt, zoom, and focus at relatively high speed and typically used to track subjects.

Typically mini-dome and bullet cameras require manual three axis adjustments, which included pan, tilt, and Z-axis rotate, so they can be wall mounted, and allow for the camera image adjustments for the image pointing at the desired location and to be level to the ground. This requires removal or loosing of the bubble cover or some other part in order to make the adjustments. Also, after the initial installation there are often scene changes or facility re-arrangements that require adjustment to camera viewing direction, and these are problematic, since service personnel need to go to the camera, often use a ladder, open the camera, make the adjustment, and then close it again. The present solution can enable remote positioning functionality, including to maintain a level image, without requiring manual adjustments even when scene changes or other facility changes occur. The present solution can enable the camera to be repositioned to preset positions over time. The present solution can obviate the need for an analog video output (e.g., often needed in existing systems to connected to a local portable service monitor needed to point and level the camera image), as the camera can output digital images and the pan and tilt motions can be used to control orientation remotely.

Figure 1:
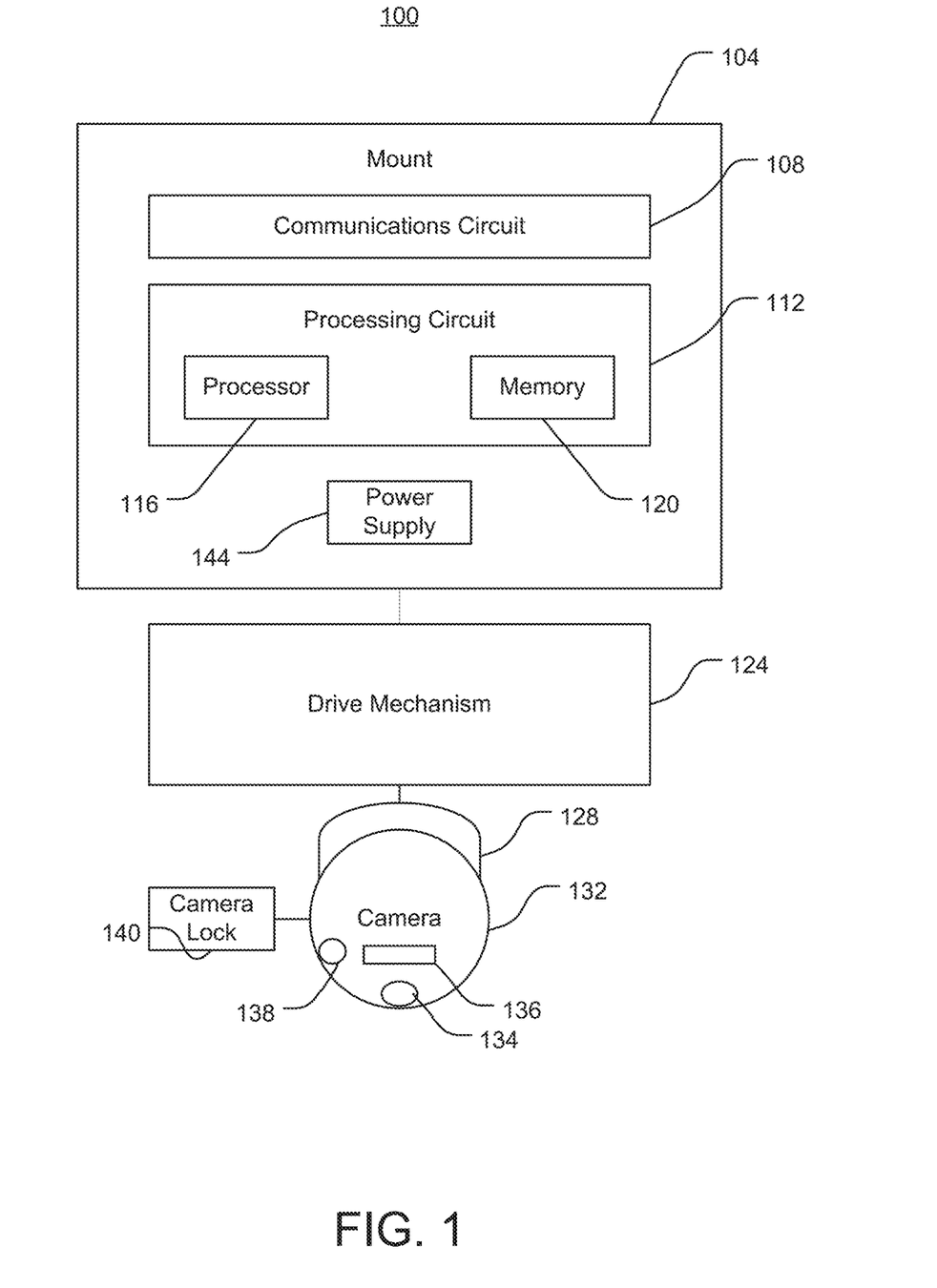
FIG. 1 is a schematic diagram of a camera system according to an embodiment of the present disclosure.

Referring now to FIG. 1, a camera system 100 is depicted. The camera system 100 includes a mount 104 housing a communications circuit 108 and a processing circuit 112. The mount 104 can be a support body, and can be mounted to a ceiling (e.g., in a first orientation) or to a wall (e.g., in a second rotation). For example, the mount 104 can enable the camera system 100 to be used for bullet-type camera and mini-dome-type camera applications. The mount 104 may have mounting holes to match standard electrical boxes, such as single/dual gang; 4S; octagon; UK single gang box; Euro gang box. The mount 104 can be used in mounting implementations including recessed into surface, pendant cap, inside corner, outside corner, and pole mounting by having extra slots for straps or tabs, and having curved or angular edges to mate with these surfaces.

The communications circuit 108 can be used to transmit data to and from the processing circuit 112, such as to transmit images and/or status information to a remote entity, and receive commands from the remote entity. The communications circuit 108 can be used to communicate between the processing circuit 112 and the camera 132. The communications circuit 108 can include wired or wireless interfaces (e.g., jacks, antennas, transmitters, receivers, transceivers, wire terminals) for conducting data communications with various systems, devices, or networks. For example, the communications circuit 108 can include an Ethernet card and port for sending and receiving data via an Ethernet-based communications network. The communications circuit 108 can include a WiFi transceiver for communicating via a wireless communications network. The communications circuit 108 can communicate via local area networks (e.g., a building LAN), wide area networks (e.g., the Internet, a cellular network), and/or conduct direct communications (e.g., NFC, Bluetooth). In some embodiments, the communications circuit 108 can conduct wired and/or wireless communications. For example, the communications circuit 108 can include one or more wireless transceivers (e.g., a Wi-Fi transceiver, a Bluetooth transceiver, a NFC transceiver, a cellular transceiver). The communications circuit 108 can communicate using various wireless communications methods described below with respect to receiving data from the camera 132.

The processing circuit 112 includes processor 116 and memory 120. Processor 116 can be a general purpose or specific purpose processor, an application specific integrated circuit (ASIC), one or more field programmable gate arrays (FPGAs), a group of processing components, or other suitable processing components. Processor 116 can execute computer code or instructions stored in memory 120 or received from other computer readable media (e.g., CDROM, network storage, a remote server, etc.).

Memory 120 can include one or more devices (e.g., memory units, memory devices, storage devices, etc.) for storing data and/or computer code for completing and/or facilitating the various processes described in the present disclosure. Memory 120 can include random access memory (RAM), read-only memory (ROM), hard drive storage, temporary storage, non-volatile memory, flash memory, optical memory, or any other suitable memory for storing software objects and/or computer instructions. Memory 120 can include database components, object code components, script components, or any other type of information structure for supporting the various activities and information structures described in the present disclosure. Memory 120 can be communicably connected to processor 116 via processing circuit 112 and may include computer code for executing (e.g., by processor 116) one or more processes described herein. When processor 116 executes instructions stored in memory 120, processor 116 generally configures the processing circuit 112 to complete such activities.

The camera system 100 includes a drive mechanism 124. The processing circuit 112 can control operation of the drive mechanism 124. The drive mechanism 124 is coupled to a camera support 128, which supports a camera 132. The drive mechanism 124 can control orientation of the camera 132, such as to rotate the camera 132 along pan and tilt axes of the camera 132. The processing circuit 112 can control operation of the drive mechanism 124 automatically (e.g., based on a predetermined movement plan) and/or responsive to user input. The processing circuit 112 can use positioning feedback, such as a position encoder and/or a count of movement steps, to provide relative, absolute, and preset positioning control. In some embodiments, the mount 104 is removably connected to the drive mechanism 124, such as to enable disconnection and reconnection of the drive mechanism 124 (and thus the camera 132) from the mount 104, such as for reorienting the camera 132 when adjusting from a wall-mounted orientation to a ceiling-mounted orientation or vice versa. In some embodiments, the mount 104 is attached to the drive mechanism 124 using a rotating swivel joint to enable reorienting the drive mechanism 124 (and thus the camera 132), such as when adjusting from a wall-mounted orientation to a ceiling mounted orientation or vice versa.

The camera 132 can include a lens 134 and a sensor module 136 that receives light via the lens 134 and outputs one or more images corresponding to the received light. The camera 132 can define a field of view representative of the received light and the one or more images. As the orientation of the camera 132 is manipulated, the field of view will change. The camera 132 can have a generally spherical shape, such as by having a spherical housing that includes the lens 134 and sensor module 136. By implementing the drive mechanisms and data communication systems described herein, the spherical housing of the camera 132 can be provided with no wires, conductors, or protruding mechanical parts, enabling the camera 132 to be completely sealed and thus obviating the need for a bubble cover. In some embodiments, the camera 132 supports an infrared (IR) illuminator 138 spaced from the lens, such as an IR illuminator 138 disposed in a separate compartment from the lens, so as to mitigate reflection or bleed into the lens. The camera 132 may be covert, as a direction in which the lens of the camera 132 is pointing may not be observable. The camera 132 can be implemented using a full camera/lens cover bubble. The camera 132 can be implemented using a bubble-less flat clear disc lens cover. The camera 132 can be configured to output 4K resolution images.

The camera 132 and camera support 128 can have relatively low friction surfaces to reduce resistance to pan and tilt movements. In some embodiments, a magnetic levitation system can be used to magnetically support the camera 132 relative to the camera support 128. For example, the camera support 128 can include a plurality of electromagnets that apply selective magnetic fields to permanent magnets attached to the camera 132 to support the camera 132. The processing circuit 112 can control the plurality of electromagnets to control orientation of the camera 132 relative to the camera support 128.

The camera 132 can communicate with the processing circuit 112 (e.g., via the communications circuit 108) or other remote entities using various communications protocols. For example, the camera 132 can transmit the one or more images to the processing circuit 112 using at least one of visible light communication (VLC), NFC, near-field magnetic induction (NFMI), and light fidelity (Li-Fi). In some embodiments, the camera 132 receives wireless power (e.g., from a power supply housed in the mount 104) via inductive coupling. Various such wireless power and data communications protocols can be used to obviate the need for wired connection between the camera 132 and the mount 104.

The camera system 100 can include a power supply 144, which as depicted in FIG. 1 can be supported by the mount 100. The processing circuit 112 can provide power to the drive mechanism 124 and/or camera 132 using the power supply 144. The power supply 144 can include a battery. The power supply 144 can include a connection to a remote power source (e.g., mains power).

Figure 2A:
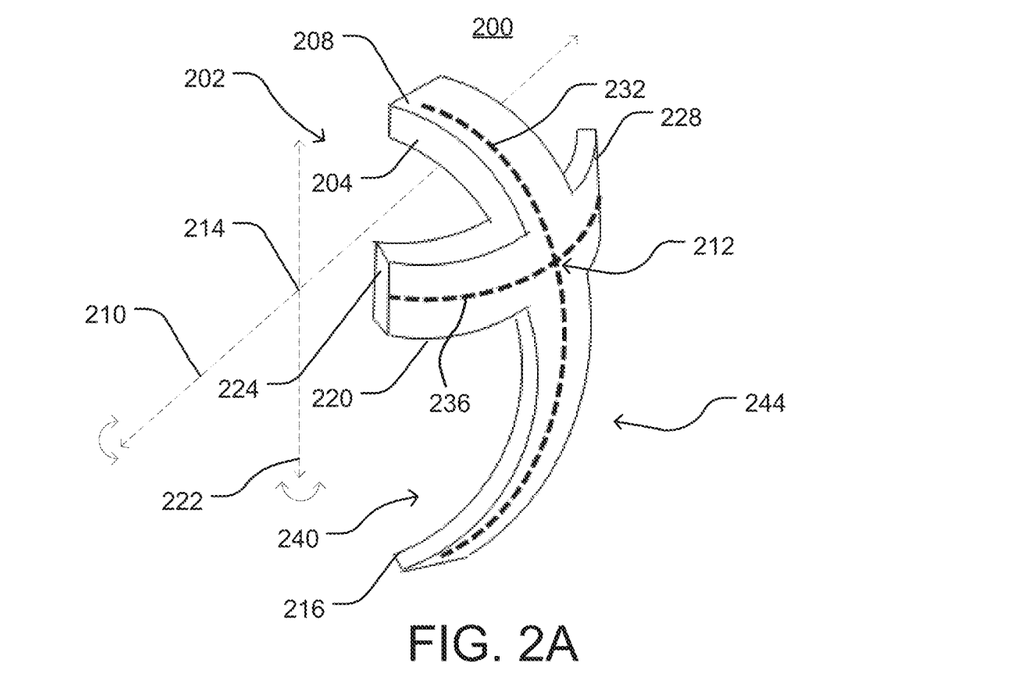
FIGS. 2A-2C are schematic diagrams of a drive system that can drive a camera of according to an embodiment of the present disclosure.
Figure 2B:
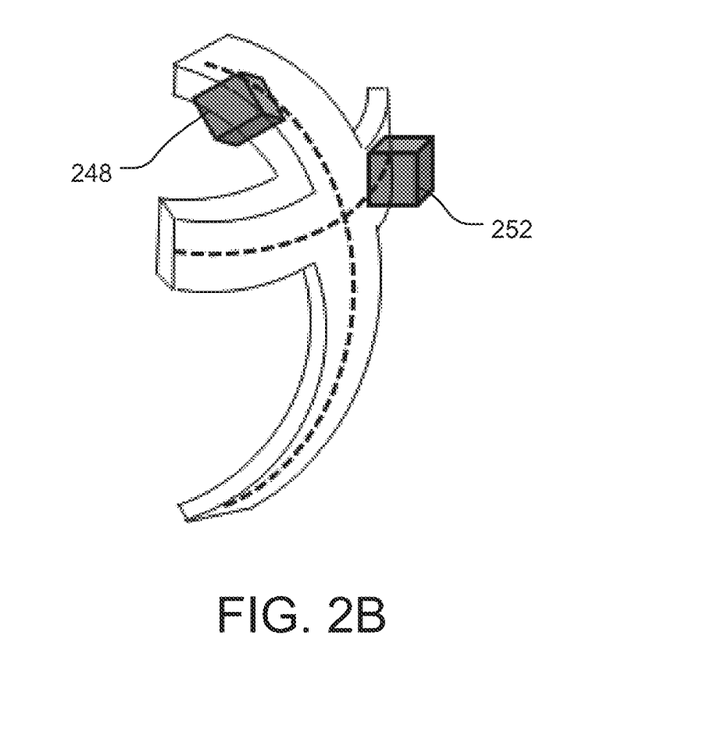
Figure 2C:
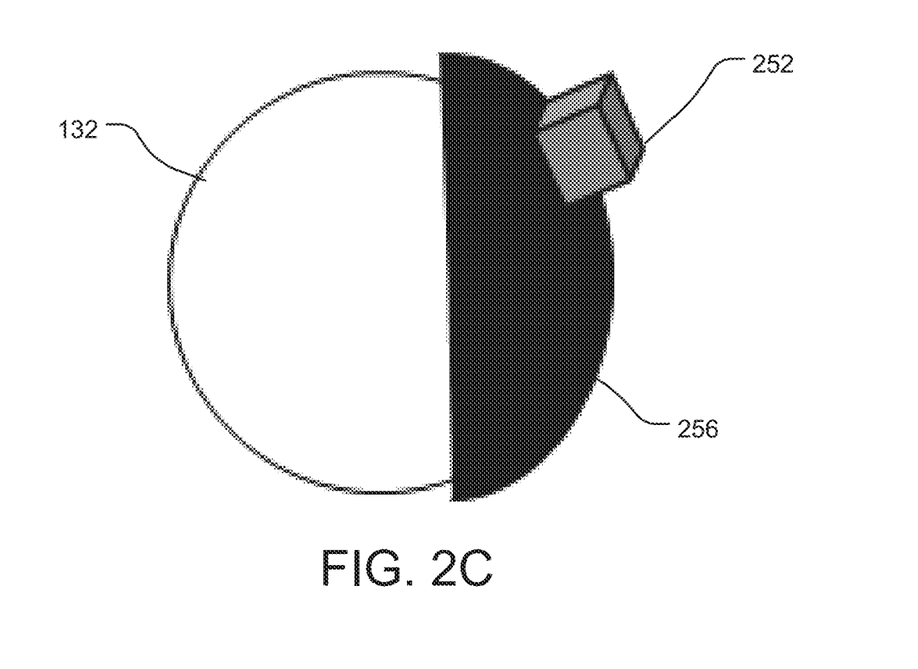

Referring now to FIGS. 2A-2C, a drive system 200 is depicted. The drive system 200 can be used to implement features of the drive mechanism 124 and camera support 128 described with reference to FIG. 1. For example, the drive system 200 can be used to rotate the camera 132 about pan and tilt axes of the camera 132.

The drive system 200 includes a track 202 that can support the camera 132 for rotation of the camera 132 relative to the track 202. The track 202 can be coupled to the mount 104 in a fixed manner, such that rotating the camera 132 causes a relative orientation of the camera 132 to change relative to a fixed orientation of the mount 104 (e.g., wall-mounted orientation or ceiling-mounted orientation). The track 202 may be disposed in a track housing 256 coupled to the camera 132; the track housing 256 can implement the camera support 128 described with reference to FIG. 1.

The track 202 includes a first member 204 extending from a first end 208 to a second end 216, and a second member 220 extending from a third end 224 to a fourth end 228. The first member 204 and second member 220 meet at a center 212 of the track 202. As depicted in FIGS. 2A-2C, the first and second members 204 have concave curvatures shaped to receive the camera 132. In some embodiments, the first and second members 204 have spherical curvatures, such that each point along the members 204, 220 have a same radius relative to a sphere center 214 of the respective members 204, 220. In some embodiments, the second member 220 lies along a latitudinal line of a geographic coordinate system (e.g., defining degrees latitude and longitude, which may be less computationally complex than a spherical coordinate system for the processing circuit 112 to use to define control instructions for moving the camera). The latitudinal line may be at approximately 45 degrees (e.g., greater than 37.5 degrees and less than 52.5 degrees; greater than 40 degrees and less than 50 degrees; greater than 42.5 degrees and less than 47.5 degrees; greater than 44 degrees and less than 46 degrees; 45 degrees).

The first member 204 defines a first rail 232 on an inner surface 240 of the first member 204. The first rail 232 can be a tilt rail, such that rotation of the camera 132 about the first rail 232 causes the camera 132 to tilt. The second member 220 defines a second rail 236 on an outer surface 244 of the second member 220. The second rail 236 can be a pan rail, such that rotation of the camera 132 about the second rail 236 causes the camera 132 to pan. The rails 232, 236 may also each be on opposite surfaces of the track 202. The rails 232, 236 may each be provided as mating gear teeth.

The drive system 200 includes a first gear 248 coupled to the first rail 232 and the camera 132. For example, the first gear 248 may be disposed within the camera 132 (e.g., with a housing of the camera 132). The first gear 248 may be driven by a first motor gear drive module (e.g., as described with reference to FIG. 3) to be moved along the first rail 232, such as by moving along the mating gear teeth of the first rail 232. As such, the first gear 248 can enable the camera 132 to be moved up and down about a tilt axis 210 corresponding to the first rail 232, by moving the camera 132 relative to the track 202.

The drive system 200 includes a second gear 252 coupled to the second rail 236. The second gear 252 may be driven by a second motor gear drive module (e.g., as described with reference to FIG. 3) to be moved along the second rail 236, such as by moving along the mating gear teeth of the second rail 236. As such, the second gear 252 can enable the camera 132 to be moved about a pan axis 214 corresponding to the second rail 236, by moving the track 202 and camera 132 relative to the second gear 252 (e.g., to the mount 104 relative to which the second gear 252 is in a fixed relationship).

In some embodiments, the drive system 200 includes at least one home position sensor, which can output a known position of the first gear 248 and/or the second gear 252, and thus the camera 132, subsequent to reset or power on of the drive system 200. In some embodiments, the drive system 200 moves the first gear 248 and/or the second gear 252 to a respective predetermined home position, such as ends 208, 216, 224, 228.

The first and second motor gear drive modules may be implemented by various drives. For example, single gear drive, wheel drive, or worm gear drive assemblies may be used.

Figure 3A:
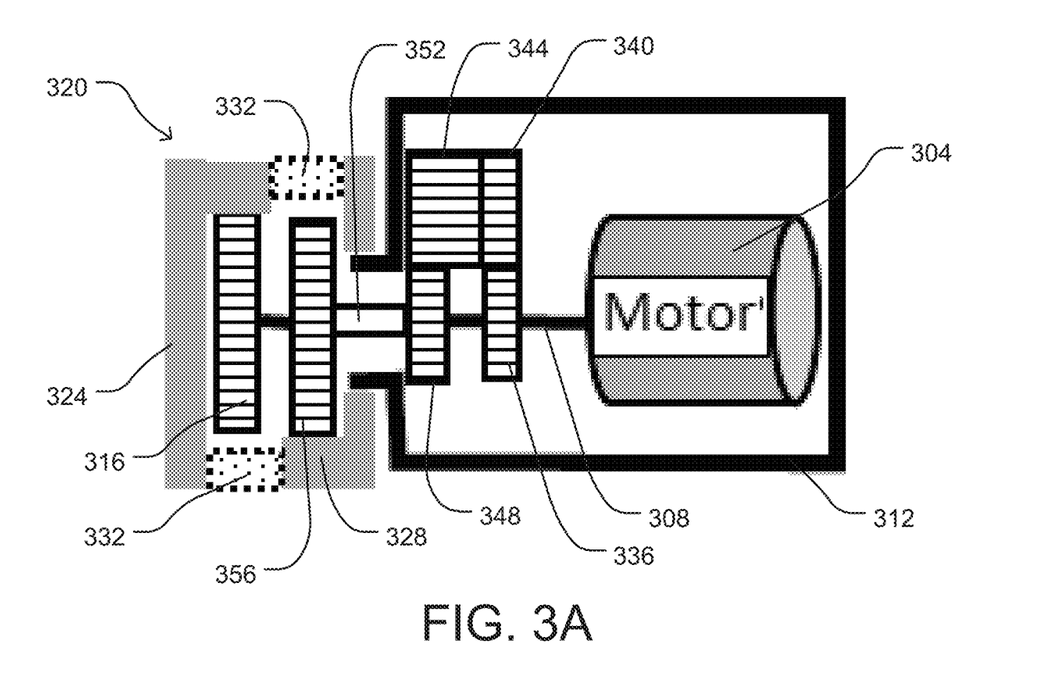
FIGS. 3A-3B are schematic diagrams of a motor gear drive module of the drive system of FIGS. 2A-2C according to an embodiment of the present disclosure.
Figure 3B:
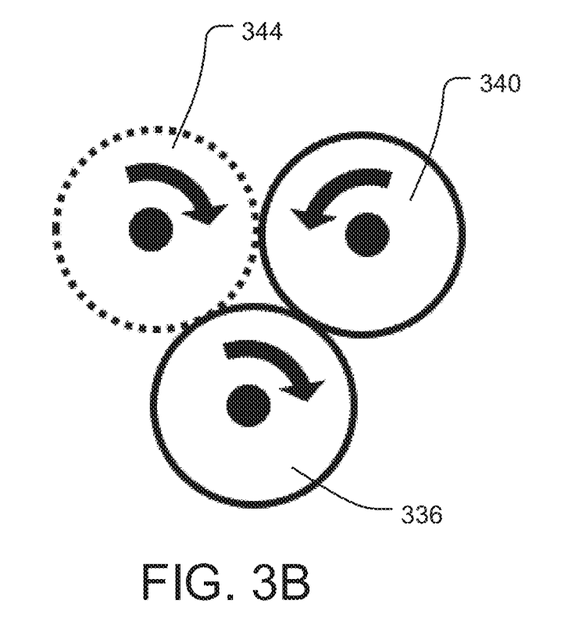

FIGS. 3A-3B depict a motor gear drive module 300 that may be used to drive the gears 248, 252 of FIGS. 2A-2C. The motor gear drive module 300 includes a motor 304 coupled to a first shaft 308. The motor 304 can be a DC motor. The first shaft 308 can be solid. The first shaft 308 can extend through a motor housing 312 to a first output gear 316 engaged to a first side 324 of a rail 320 (e.g., first rail 232; second rail 236).

The first side 324 of the rail 320 may be separated by one or more track insulators 332 from a second side 328 of the rail 320. The track insulators 332 can electrically insulate the first side 324 from the second side 328, such as to enable power and electrical signals to be conducted in both directions through the motor gear drive module 300 (e.g., from the camera 132 to the processing circuit 112 and vice versa).

The motor gear drive module 300 includes a first drive gear 336 fixed to the shaft 308 to rotate with the shaft 308. The first drive gear 336 is engaged to a second drive gear 340 spaced from a shaft axis of the first shaft 308. The second drive gear 340 is coupled to a third drive gear 344, which is thicker than the first drive gear 336 and second drive gear 340 (e.g., extends along a greater length of an axis parallel to an axis of the first shaft 308 than the second drive gear 340). The second drive gear 344 is engaged to a fourth drive gear 348, which is disposed along the axis of the first shaft 308 and coupled to a second shaft 352. The second shaft 352 can be coaxial with the first shaft 308. The second shaft 352 can have a greater radius than the first shaft 308, such that the first shaft 308 is disposed within the second shaft 352.

The second shaft 352 is coupled to a second output gear 356 that is engaged to the second side 328 of the rail 320. As such, the motor 304 can drive the first output gear 316 via the first shaft 308 to drive the camera in a first direction along the rail 320, and can drive the second output gear 356 via the drive gears 340, 344, and 348 and the second shaft 352 to drive the camera in a second direction opposite the first direction along the rail 320. As depicted in dotted lines in FIG. 3B, the third drive gear 344, while not directly coupled to the first drive gear 336 and second drive gear 340, can be enabled to rotate in an opposite direction as the second drive gear 340; for example, first output gear 316 and second output gear 356 can rotate in opposite directions such that the first output gear 316 drives the first side 324 of the rail 320 and the second output gear 356 drives the second side 328 of the rail 320. As such, the components of the motor gear drive module 300 can be driven along the track 320 by both sides, using counter rotation drive gears, and sideways torque and pinching of the motor gear drive module 312 in the rail 320 can be prevented.

In some embodiments, the motor drive gear module 300 includes a capacitor (e.g., super capacitor) to store electrical energy, such as to reduce peak energy demand. For example, the capacitor can store electrical energy received for operating the camera 132, and output the stored electrical energy to the motor drive gear module 300 when pan and/or tilt motions are performed. In some embodiments, peak power consumption can be reduced by alternately operating the motors 304 (e.g., alternately operating motor 304 for the pan axis movement and motor 304 for the tilt axis movement).

Referring back to FIG. 1, in some embodiments, the camera system 100 includes a camera lock 140. The camera lock 140 can fix a position and/or orientation of the camera 132, such as to prevent undesirable (e.g., accidental or malicious) movement of the camera 132. The camera lock 140 can include various locking mechanisms.

Figure 4:
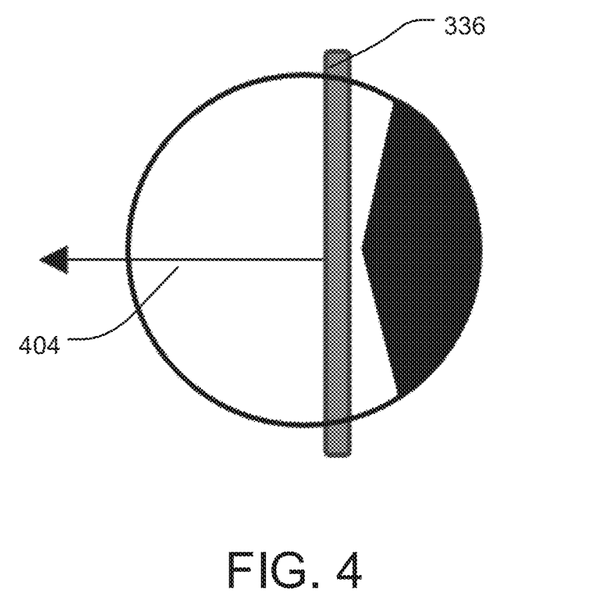
FIG. 4 is a schematic diagram of a camera lock according to an embodiment of the present disclosure.

Referring further to FIG. 1 and to FIG. 4, in some embodiments, the camera lock 136 includes at least one of a mechanical lock to prevent motion of the camera 132 in a first direction 404 and a clamp 408 disposed around the camera 132 (e.g., spherical housing of the camera 132). In some embodiments, the mechanical lock includes memory wire. The memory wire can decrease in size (e.g., shrink) responsive to receiving an electrical current. For example, the memory wire can decrease by approximately four percent responsive to receiving an electrical current on the order of milliamps. In some embodiments, the memory wire is a Nitinol memory wire. In some embodiments, the memory wire is implemented using a Shape Memory Alloy Latch Actuator Assembly manufactured by AUTOSPLICE INC. of San Diego, Calif.

In some embodiments, the mechanical lock includes a Bi-metal strip. The Bi-metal strip can change in shape responsive to receiving heat. For example, the Bi-metal strip can clamp at a typical operating temperature (e.g., an operating temperature at which the camera 132 is rated to operate), and change in shape to a relaxed state responsive to receiving heat from a heating element.

The mechanical lock can include a solenoid. For example, the solenoid can change from a first state (e.g., clamp state) to a second state (e.g., unclamped state) responsive to receiving an electrical current, to allow the camera 132 to be moved.

In some embodiments, the clamp 408 is implemented using at least one of bubble compression, manipulation of drive gears (e.g., gears of the motor gear drive module 300), manipulation of the track on which the camera 132 moves (e.g., track 202), and a ring clamp. The drive gears can be shifted relative to the track to be held in place against the track, prevent motion of the camera 132 relative to the track. A holding brake may be positioned against the track to capture the track.

In some embodiments, the processing circuit 112 can cause an electrical short of windings of the 304 to lock the position of the camera 132. As such, the processing circuit 112 can enable an electronic braking system.

Figure 5A:
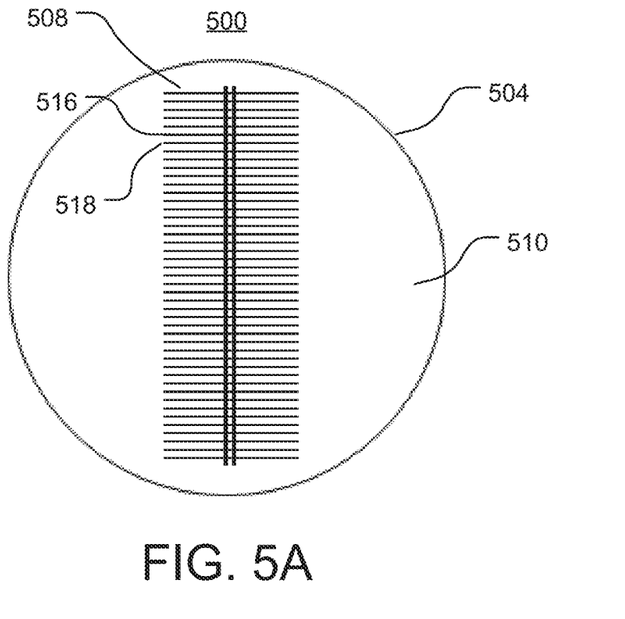
FIGS. 5A-5B are schematic diagrams of a magnetic drive system that can drive a camera according to an embodiment of the present disclosure.
Figure 5B:
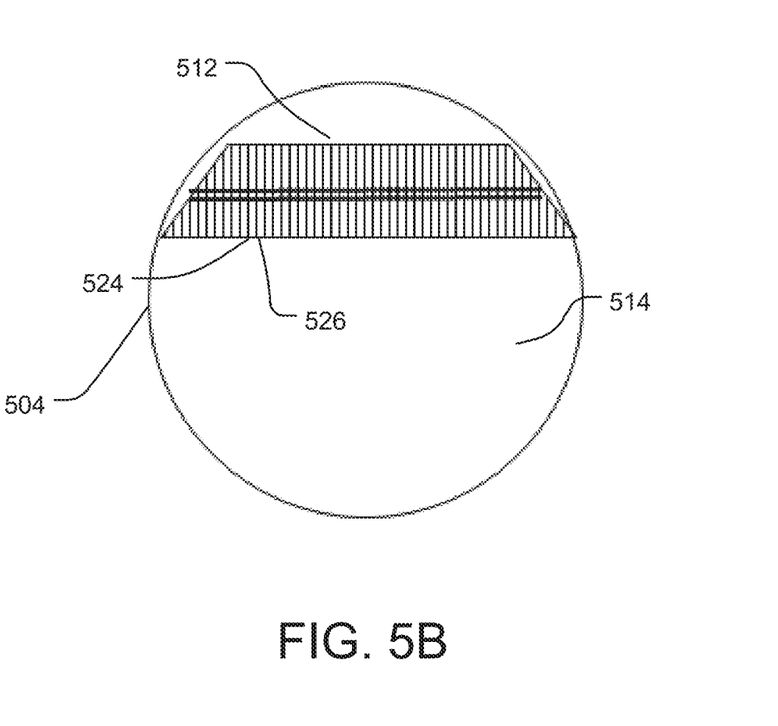

Referring now to FIGS. 5A-5B, a magnetic drive system 500 is depicted. The magnetic drive system 500 can be used to implement the drive mechanism 124 described with reference to FIG. 1, and can incorporate features of the drive mechanism 124 and camera support 128. The magnetic drive system 500 includes a housing 504 defining a first magnetic track 508 and a second magnetic track 512. The housing 504 can incorporate features of the camera support 128 described with reference to FIG. 1 and the track housing 256 described with reference to FIGS. 2A-2C. In some embodiments, the first magnetic track 508 extends along an inner surface 510 of the housing 504, while the second magnetic track 512 extends along an outer surface 514 of the housing 504. The first and second magnetic tracks 508, 512 may have a similar geometry as the rails 204, 220 depicted in FIGS. 2A-2B.

The first magnetic track 508 can be used for tilting the camera 132. The first magnetic track 508 extends along a longitudinal center line of the housing 504. The first magnetic track 508 includes alternating magnetic strips 516, 518 of differing polarity (e.g., strips 516 being north-polarized and strips 518 being south-polarized or vice versa). The magnetic strips 516, 518 can be permanent magnets. The first magnetic track 508 can define a slot 520 extending into the inner surface 510 of the housing 504, such that a complementary member (not shown) of the camera 132 can be received in the slot 520 to prevent the camera 132 from moving side to side relative to the first magnetic track 508.

The camera 132 can include a plurality of electromagnets (not shown) which can interact with magnetic fields of the strips 516, 518 in a manner analogous to a stepper motor to move the camera 132 relative to the first magnetic track 508. In some embodiments, the plurality of electromagnets can be energized in a sequence of four or more alternating phases, and can be arranged parallel to and in line with the strips 516, 518 when the camera 132 is coupled to the housing 504. As such, based on energization of the plurality of electromagnets, poles of the permanent magnets of the strips 516, 518 will advance to each elctromagnetic phase position such that the number of steps per distance will be the number of permanent magnet poles in the distance times the number of phases of the plurality of electromagnets. The magnetic drive system 500 can perform micro stepping by partially energizing adjacent phases of the plurality of electromagnets to position the permanent magnets of the strips 516, 518 between the respective plurality of electromagnets in a manner proportional to an amount each electromagnet is energized, enabling finer position control than the distance between strips 516, 518.

The second magnetic track 512 can be used for panning the camera 132. The second magnetic track 508 extends along a latitudinal line of the housing 504, such as a 45 degree latitude line. The second magnetic track 512 includes alternating magnetic strips 524, 526 of differing polarity (e.g., strips 524 being north-polarized and strips 526 being south-polarized or vice versa). The magnetic strips 524, 526 can be permanent magnets. The second magnetic track 512 can define a slot 528 extending into the outer surface 514 of the housing 504, such that a complementary member (not shown) of the component to which the housing 504 is coupled (e.g., mount 104 and/or drive mechanism 124) can be received in the slot 528 to prevent the camera 132 from moving side to side relative to the second magnetic track 512.

The component to which the housing 504 is coupled can include a plurality of electromagnets similar to the plurality of electromagnets of the camera 132. The plurality of electromagnets can be energized in a sequence of four or more alternating phases, and can be arranged parallel to and in line with the strips 524, 526 when the component is coupled to the housing 504. As such, based on energization of the plurality of electromagnets, poles of the permanent magnets of the strips 524, 526 will advance to each elctromagnetic phase position such that the number of steps per distance will be the number of permanent magnet poles in the distance times the number of phases of the plurality of electromagnets. The magnetic drive system 500 can perform micro stepping by partially energizing adjacent phases of the plurality of electromagnets to position the permanent magnets of the strips 524, 526 between the respective plurality of electromagnets in a manner proportional to an amount each electromagnet is energized, enabling finer position control than the distance between strips 524, 526.

Figure 6A:
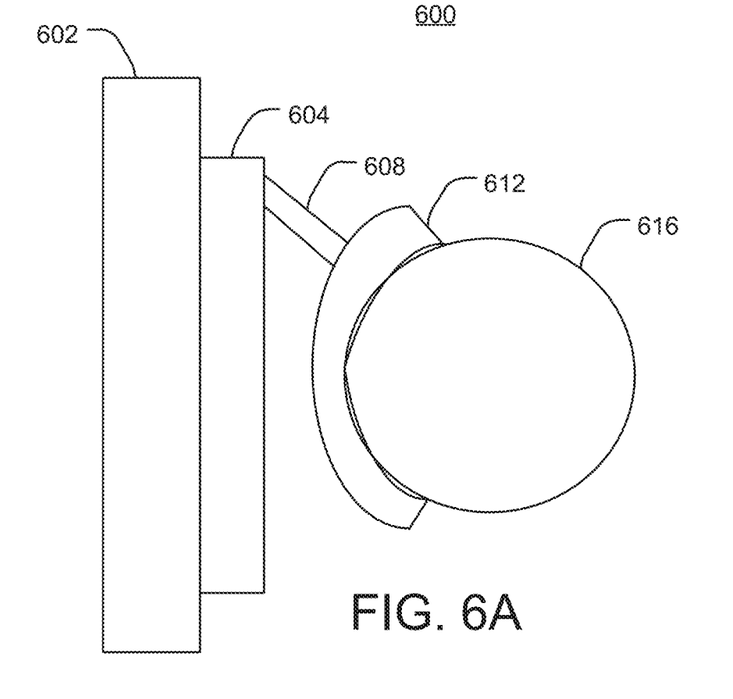
FIG. 6A is a schematic diagram of a camera system mounted to a wall according to an embodiment of the present disclosure.

Referring now to FIG. 6A, a wall-mounted camera system 600 is depicted. The camera system 600 can incorporate features of the various devices and systems described herein, including the camera system 100. The camera system 600 includes a mount 604 mounted to a wall 602. The mount 604 supports a drive mechanism 608 attached to a camera support 612. As depicted in FIG. 6A, the drive mechanism 608 can be attached to a pan axis track of the camera support 612, which may be disposed at a 45 degree latitude of the camera support 612. The camera support 612 is coupled to a camera 616. In particular, the camera 616 is coupled to a tilt axis track of the camera support 612. The drive mechanism 608 can drive the camera support 612 about the pan axis of the track of the camera support 612 to pan the camera 616, and can drive the camera 616 about a tilt axis track of the camera support 612 to tilt the camera 616.

Figure 6B:
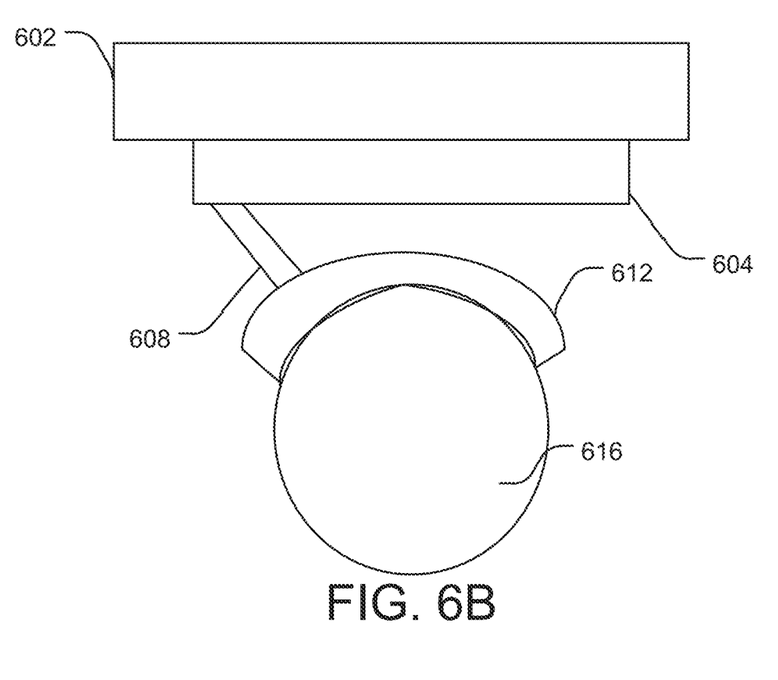
FIG. 6B is a schematic diagram of a camera system mounted to a ceiling according to an embodiment of the present disclosure.

Referring now to FIG. 6B, the camera system 600 is depicted as ceiling-mounted. The camera system 600 can be transitioned from wall-mounted to ceiling-mounted by rotating the camera system 600, including disconnecting and reconnecting the camera system 600 and/or using a swivel joint. As depicted in FIG. 6B, components of the camera system 600 are rotated such that the drive mechanism 608 is maintained as attached to the pan axis track at the 45 degree latitude of the camera support 612. Images outputted by the camera 616 can be rotated based on the orientation of the camera system 600. As such, the pan axis of the camera 616 can be kept in a vertical direction without the need for a rotate mechanism. In some embodiments, the camera system 600 can be table mounted by similarly rotating the camera system 600 180 degrees and rotating the outputted images 180 degrees.

Figure 7:
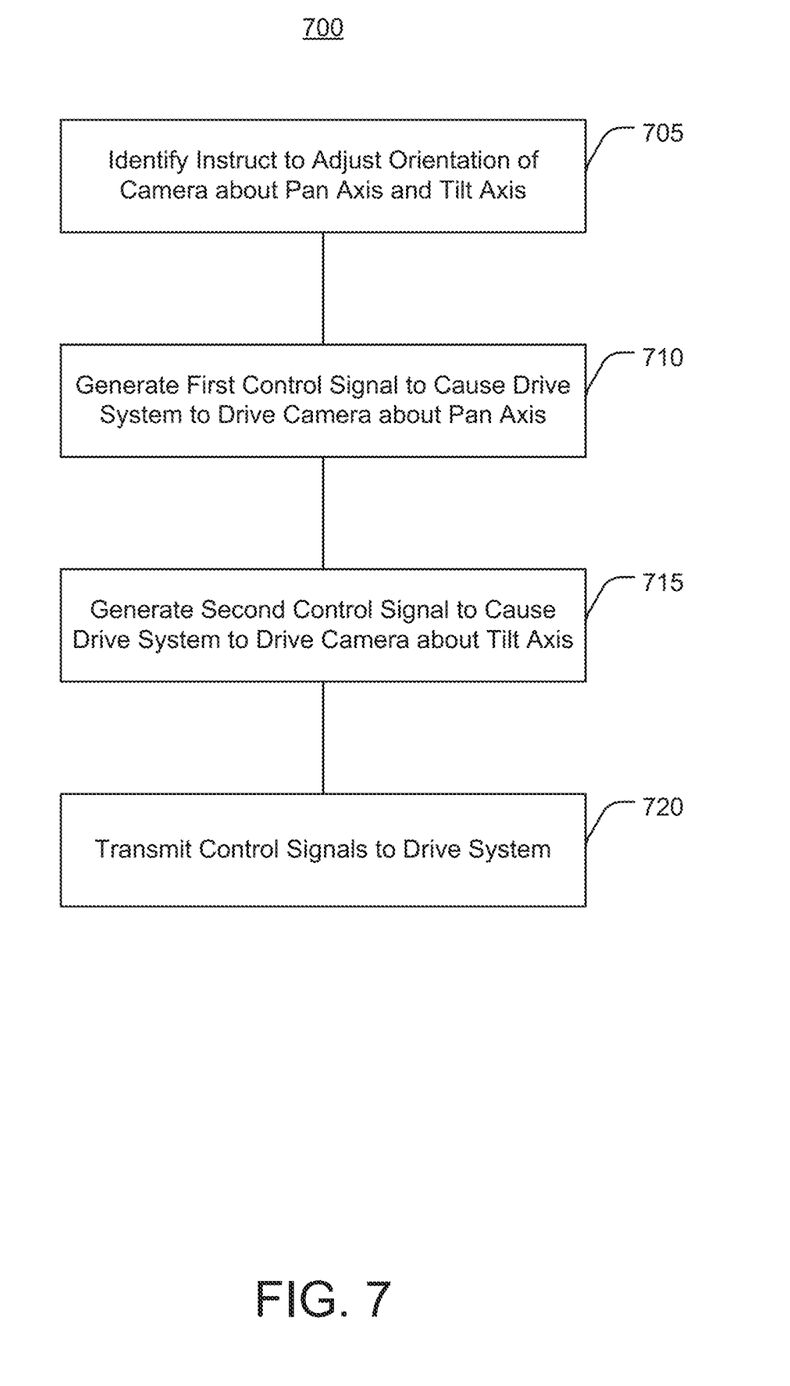
FIG. 7 is a flow diagram of a method of operating a camera system according to an embodiment of the present disclosure.

Referring now to FIG. 7, a method 700 of operating a camera system is depicted. The method 700 can be performed using various camera systems and devices described herein, including the camera system 100.

At 705, a processing circuit identifies an instruction to adjust an orientation of a camera about at least one of a pan axis of the camera or a tilt axis of the camera. The instruction can be a predetermined instruction. For example, the processing circuit can identify the instruction by retrieving the instruction from a predetermined schedule of orientations of the camera. The instruction can be received based on a remote instruction, such as a user input. For example, the processing circuit can be coupled to a communications circuit that receives the remote instruction from a remote electronic device.

At 710, the processing circuit generates a first control signal to cause the camera to move to a first pan angle relative to the pan axis. The processing circuit can generate the first control signal to control operation of a drive system coupled to the camera. In some embodiments, the drive system includes a track having a first member defining the pan axis. The drive system can include a first gear attached to the camera and engaged to the first member, and at least one motor gear drive module that can move the first gear along the first member. The processing circuit can generate the first control signal to cause the motor gear drive module to move the first gear to a first position corresponding to the first pan angle.

In some embodiments, the drive system includes a housing defining a first magnetic track extending along a first surface of the housing shaped to receive the camera. The first magnetic track can include a plurality of first magnetic strips of alternating polarity (e.g., each strip has an opposite polarity as adjacent strips, such as in a North-South-North order). The drive system can include a plurality of first electromagnets disposed within and/or on a surface of the camera. The processing circuit can generate the first control signal to cause the plurality of first electromagnets to be energized in a manner that outputs a first magnetic field to drive the first magnetic track to the first position corresponding to the first pan angle.

At 715, the processing circuit generates a second control signal to cause the camera to move to a first tilt angle relative to the tilt axis. The processing circuit can generate the second control signal to control operation of the drive system. For example, the drive system can include a second member attached to the first member and defining the tilt axis. The processing circuit can generate the second control signal to cause the at least one motor gear drive module to move a second gear engaged to the second member and to a camera support supporting the camera to a second position corresponding to the second pan angle. The drive system can include a plurality of second electromagnets, and the processing circuit can generate the second control signal to cause the plurality of second electromagnets to be energized in a manner that outputs a second magnetic field to drive a second magnetic track to the second position corresponding to the first tilt angle.

At 720, the processing circuit can transmit the first control signal and/or the second control signal to the drive system. As such, the processing circuit can cause the camera to be adjusted (e.g., rotated) to the first pan angle and/or the first tilt angle as indicated by the instruction.

In some embodiments, the processing circuit causes a camera lock to selectively lock or unlock based on the identified instruction. For example, the processing circuit can determine the camera lock to be in a locked state, and responsive to determining that the camera lock is in the locked state and identifying the instruction to adjust the orientation of the camera, the processing circuit can cause the camera lock to switch to the unlocked state. In some embodiments, responsive to transmitting the first and/or second control signals, the processing circuit can cause the camera lock to switch to the locked state.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A camera system, comprising:
a camera including a lens and a sensor module that receives light via the lens and outputs one or more images based on the received light;
a drive system comprising:
a track including a first member and a second member, the first member defining a first rail on an inner surface of the first member, the second member defining a second rail on an outer surface of the second member;
a first gear coupled to the first rail and the camera;
a second gear coupled to the second rail and to a camera support; and
at least one gear drive module that drives the first gear to a first position along the first rail responsive to a first control signal and the second gear to a second position along the second rail responsive to a second control signal; and
a processing circuit that generates the first control signal and the second control signal based on at least one of a user input and a predetermined instruction.

2. The camera system of claim 1, comprising:
a mount attached to a wall or a ceiling, the processing circuit housed by the mount, the mount attached to the drive system at an angle greater than 40 degrees and less than 50 degrees, the mount at least one of (i) removably connected to the drive system to enable adjustment of an orientation of the camera relative to the mount and (ii) attached to the drive system using a rotating swivel joint to enable adjustment of the orientation of the camera relative to the mount.

3. The camera system of claim 1, comprising:
the first member is shaped such that moving the first gear along the first member rotates the camera about one of a pan axis or a tilt axis of the camera, and the second member is shaped such that moving the second gear along the second member rotates the camera about an other of the pan axis or the tilt axis.

4. The camera system of claim 1, comprising:
a camera lock coupled to the camera to selectively restrict movement of the camera responsive to switching the camera lock to a locked state.

5. The camera system of claim 1, comprising:
the at least one gear drive module includes a capacitor that stores energy received by the at least one gear drive module to reduce peak power consumption by the at least one gear drive module.

6. The camera system of claim 1, comprising:
the at least one gear drive module uses a plurality of gears to drive the first gear in a first direction from a home position to the first position and in a second direction from the first position to the home position.

7. The camera system of claim 1, comprising:
the second member is oriented about a forty five degree latitude of the camera.

8. The camera system of claim 1, comprising:
a communications circuit that the processing circuit uses to wirelessly transmit the first and second control signals to the camera and wirelessly receive the one or more images from the camera.

9. The camera system of claim 1, comprising:
the camera receives power from the at least one gear drive module and transmits the one or more images to the processing circuit via the at least one gear drive module.

10. The camera system of claim 1, comprising:
the drive system rotates the camera about a pan axis and a tilt axis of the camera, and the camera is fixed about a z axis perpendicular to the pan axis and the tilt axis.

11. A camera system, comprising:
a camera including a lens and a sensor module that receives light via the lens and outputs one or more images based on the received light;
a housing defining a first magnetic track and a second magnetic track, the first magnetic track extending along a first surface of the housing shaped to receive the camera, the second magnetic track extending along a second surface of the housing opposite the first surface, the first magnetic track including a plurality of first magnetic strips of alternating polarity, the second magnetic track including a plurality of second magnetic strips of alternating polarity;
a plurality of first electromagnets disposed at least one of within and on a surface the camera;
a camera support including a plurality of second electromagnets; and
a processing circuit that causes the plurality of first electromagnets to output a first magnetic field to drive the first magnetic track to a first position and causes the plurality of second electromagnets to output a second magnetic field to drive the second magnetic track to a second position, the processing circuit energizes the plurality of first electromagnets and the plurality of second based on at least one of a user input and a predetermined instruction.

12. The camera system of claim 11, comprising:
the first magnetic track defines a slot in which a slot engaging member of the camera is received.

13. The camera system of claim 11, comprising:
the processing circuit extracts, from the at least one of the user input and the predetermined instruction, an indication of a desired pan angle of the camera, and energizes the plurality of first electromagnets to drive the first magnetic track to the first position based on the indication of the desired pan angle.

14. The camera system of claim 11, comprising:
the processing circuit extracts, from the at least one of the user input and the predetermined instruction, an indication of a desired tilt angle of the camera, and energizes the plurality of second electromagnets to drive the second magnetic track to the second position based on the indication of the desired tilt angle.

15. The camera system of claim 11, comprising:

the processing circuit uses the plurality of first electromagnets and the plurality of second electromagnets to respectively move the camera about a pan axis and a tilt axis of the camera, and the camera is fixed about a z axis perpendicular to the pan axis and the tilt axis.

16. The camera system of claim 11, comprising:

a camera lock coupled to the camera to selectively restrict movement of the camera responsive to switching the camera lock to a locked state.

17. The camera system of claim 11, comprising:

the processing circuit causes the camera to move along the first magnetic track in a micro step less than a distance between adjacent first magnetic strips of the first magnetic track by partially energizing adjacent phases of the plurality of first electromagnets.

18. A method, comprising:

identifying, by a processing circuit, an instruction to adjust an orientation of a camera about a pan axis and a tilt axis;

generating, by the processing circuit, a first control signal to cause a drive system to drive the camera to a first pan angle based on the identified instruction by generating the first control signal to cause a plurality of first electromagnets to output a first magnetic field to cause a first magnetic track coupled to the camera to move to a first position corresponding to the first pan angle;

generating, by the processing circuit, a second control signal to cause the drive system to drive the camera to a first tilt angle based on the identified instruction by generating the second control signal to cause a plurality of second electromagnets to output a second magnetic field to cause a second magnetic track to move to a second position corresponding to the first tilt angle; and transmitting, by the processing circuit, the first control signal to the drive system and the second control signal to the drive system.

* * * * *